UNITED STATES PATENT OFFICE.

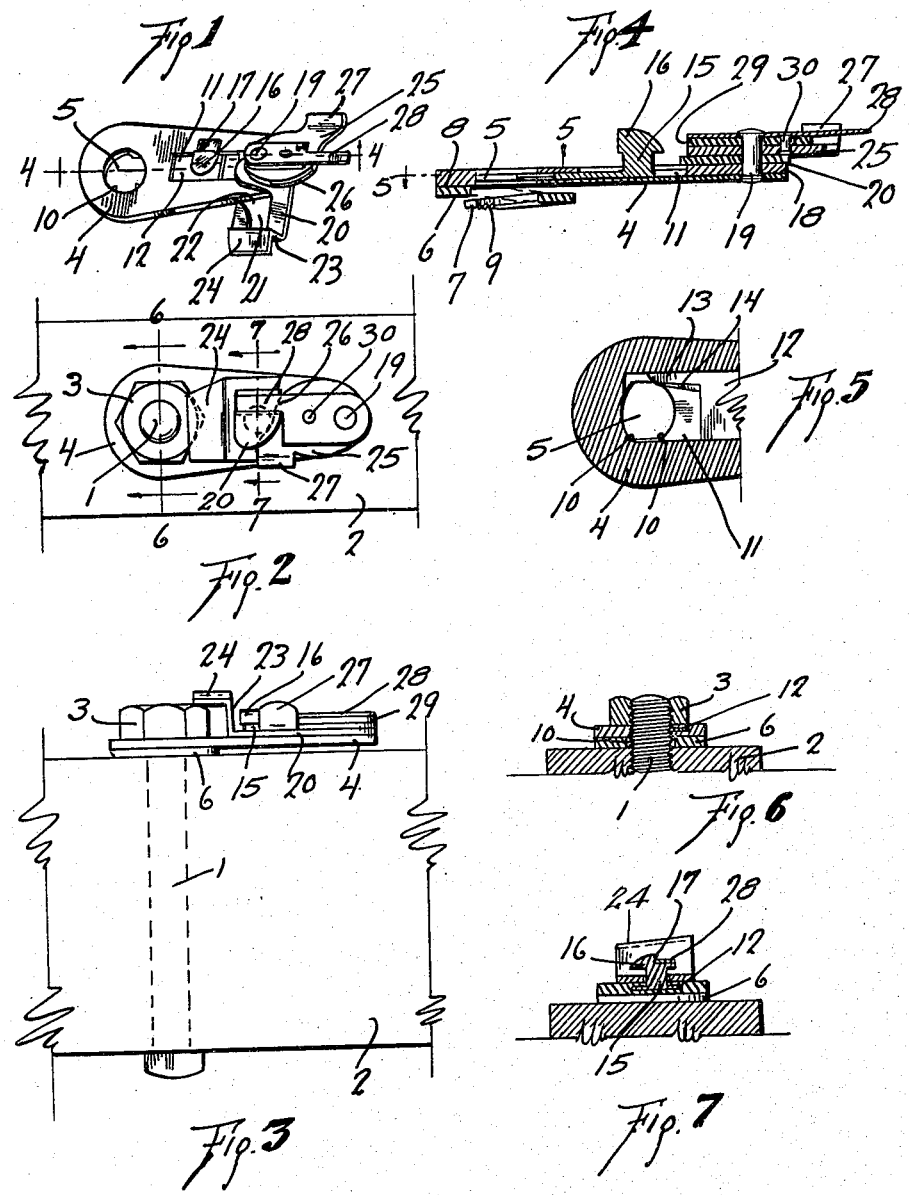

BERNARD V. APFELD, OF SPOKANE, WASHINGTON.

NUT-LOCK.

1,170,866.  Specification of Letters Patent.  Patented Feb. 8, 1916.

Application filed April 12, 1915. Serial No. 20,836.

*To all whom it may concern:*

Be it known that I, BERNARD V. APFELD, a citizen of the United States, residing at Spokane, in the county of Spokane and State of Washington, have invented certain new and useful Improvements in Nut-Locks, of which the following is a specification.

This invention relates to improvements in nut locks of that character in which engagement is effected both with the bolt and the nut.

A feature of my invention consists in the provision of a nut lock including a base provided with an aperture adapted to be disposed over the threaded portion of the bolt and having yielding means for engagement with the material or element held by the nut and bolt, and also engaging the threads of the bolt, to prevent relative movement of said base with respect, either to the bolt or to the material held by the latter.

A further object of the invention is to provide the base with a movable bolt thread engaging member adapted to be urged into engagement with the threads of the bolt in opposition to and in coaction with that portion of the base which engages the threads of the bolt.

It is a still further object of the invention to equip my improved device with a nut engaging portion or holder adapted to coact with the slide to be held thereby in an engaging position, a locking member being provided for advancing the slide into a threaded engagement position and also engaging a portion of the slide whereby all of the parts will be effectively locked to the bolt and nut.

Other features and objects of the invention will be more fully described in connection with the accompanying drawing and will be more particularly pointed out in and by the appended claims.

In the drawings: Figure 1 is a perspective view of my improved nut lock showing the same detached from the bolt, Fig. 2 is a plan view of my improved nut lock shown applied to a bolt with the nut in position, Fig. 3 is a view in side elevation of Fig. 2, Fig. 4 is an enlarged longitudinal vertical sectional view on line 4—4 of Fig. 1, Fig. 5 is a sectional view on line 5—5 of Fig. 4, Fig. 6 is a sectional view on line 6—6 of Fig. 2, Fig. 7 is a sectional view on line 7—7 of Fig. 2.

Like characters of reference designate similar parts throughout the different figures of the drawing.

As illustrated, 1 designates a bolt inserted through a part to be held, indicated at 2, a nut 3 being threaded on said bolt, as shown more particularly in Figs. 2 and 3.

My improved device comprises a base plate 4 of elongated formation, a bore 5 being provided near one end thereof for projection therethrough of the threaded end of bolt 1. The base 4 is provided with means for not only engaging the bolt but also for engagement with the stock or element 2 to be held so as to hold the one immovable against or in other words non-rotatably with respect to the other. As shown, said means comprises a washer 6 of yielding material which is mutilated to form a free end 7, the remaining end being secured to the base 4, at 8. The lower face of the resilient free end 7 is serrated, as indicated at 9, so that upon compression of the washer between the stock 2 and the base 4, the serrated end will resist rotation of the lock with respect to the stock. The bore of washer 6 is provided with spurs 10 for engagement with the threads of the bolt 1 and therefore it will be seen that the washer not only functions, when compressed, to hold the nut lock against rotation with respect to the stock, but also, to hold the bolt against rotation with respect to either the stock or lock. In Fig. 3, the washer 6 is shown compressed as it will appear when the nut 3 is turned home.

The base 4 is provided with a longitudinally extending guideway 11, which may have overhanging margins to retain a slide 12 therein for linear movement. Slide 12 is provided with a wedge shaped finger 13 having a tapered thread engaging knife edge 14 extending longitudinally thereof. The disposition of the finger 13 with respect to the spurs 10 is such that they will act in opposition in their engagement with the threaded portion of the bolt to anchor the nut lock thereto. The taper of the finger 13 provides for a wedge engagement of increasing effectiveness as the slide 12 is adjusted longitudinally toward the bolt 1. The slide 12 is provided with a shank 15 which projects from the guideway 11 and which is provided with a head 16 having a locking shoulder 17.

A filler 18 closes the rear end of the guideway 11 so as to limit retractive movement of the slide away from the bolt to a predetermined extent. Extending through the base 4 and the filler 18 is a pivot 19. A nut holder 20 is mounted upon said pivot 19 for sliding movement around said pivot as an axis, abreast of the top of said base 4. The nut holder 20 is provided with a longitudinally extending slot 21 having a lateral entrance 22. The terminal end of the nut holder 20 is bent upwardly at 23, and outwardly as at 24, the latter bend serving as a nut holding flange for engagement with the top of nut 3, as will be seen more particularly by reference to Fig. 2. I incline the nut engaging flange 24, as will be seen more particularly by reference to Fig. 7, in such a manner as to increase the effectiveness of its engagement with the nut as the nut holder approaches a final locking position. The entrance 22 is adapted to take about the shank 15 as the nut holder is turned about the pivot 19 in a clockwise direction from the position shown in Fig. 1, to the position shown in Fig. 2. After the shank 15 is disposed within the slot 21, then the slide 12 is free to be moved toward the bolt 1, and when so moved, the shank 15 will enter the end of the slot 21 and thereby positively retain the nut holder in the position shown in Fig. 2.

Reference will next be made to an improved locking member for holding all of the above named parts in a locking position. Said locking member is indicated at 25 and is mounted upon pivot 19. Pivot 19 is eccentrically disposed with respect to locking member 25 and the latter is provided with a cam 26, for engagement with shank 15 to advance the latter, and slide 12, toward bolt 1, when locking member 25 is turned on pivot 19 from the position shown in Fig. 1 to the locking position shown in Fig. 2. Locking member 25 is provided with a terminal finger grip 27 to facilitate its operation.

Mounted upon locking member 25, and considered as a unitary part thereof, is a spring strip 28. I preferably extend pivot 19 through spring 28 and the latter is desirably mounted upon a spacing strip 29, secured to the member 25. In order to hold the spring 28 nonrotatively upon the locking member 25, I may apply a rivet 30 which may extend through the spring 28 and the spacing strip 29 into member 25 but not through the latter.

Now in applying my improved lock nut, the same will be disposed over the threaded end of a bolt and then the nut 3 will be turned home to compress resilient split washer 6. The slide 12 will occupy a retracted position and the nut holder 20 will be moved into the position shown in Fig. 2. Then the locking member 25 will be turned in a clockwise direction from the position shown in Fig. 1 to the position shown in Fig. 2, the cam 26 engaging the shank 15 and advancing the slide 12 toward the bolt 1. The tapered knife edge 14 will then be wedged tightly into an interstice between the bolt threads to tightly grip the bolt in opposition to the spurs 10. When the locking member 25 reaches a final position, or is approaching a final position, spring 28 will ride over the rounded top of head 16 and spring into seated engagement against the retaining shoulder 17 whereupon the locking member will not only be locked itself but will hold the remaining parts in a locked position. In releasing the lock nut, a suitable sharp implement may be interposed between the spring 28 and the head 16 so as to lift the spring 28 out of its seat and permit the locking member 25 to be swung into the position shown in Fig. 1.

It is believed that the advantages and utility of my invention will be fully understood from the foregoing description, and while I have herein shown and described one specific form of my invention, I do not wish to be limited thereto except for such limitations as the claims may import.

I claim:

1. In a nut lock, a base having a bore therein for projection therethrough of the threaded end of a bolt and provided with spurs projecting into said bore, said base having a guideway extending longitudinally thereof, a slide movable in said guideway and having a longitudinally tapered finger provided with a thread engaging knife edge acting in opposition to said spurs, said slide having a shank projecting from said base and terminating in an enlarged head provided with a retaining shoulder, a nut holder having a flange at one end for engaging the top of a nut and provided with a slot having a laterally disposed entrance for passage about said shank to admit the latter to said slot, means pivoting said holder on said base, and a locking member mounted on said pivot means and having a cam for engagement with said shank to advance said slide into a locking position to retain said holder and said locking member being provided with a resilient locking element adapted to spring over the head of said shank and seat against said retaining shoulder, substantially as described.

2. In a nut lock, a base having a bore therein for proection therethrough of the threaded end of the bolt and provided with a split resilient washer having spurs projecting into said bore and provided with a serrated end portion for engagement with the stock to be held, a slide longitudinally movably mounted on said base and having a longitudinally tapered finger for engagement with the threads of the bolt in opposition to said spurs, said slide having a shank terminating in a retaining shoulder, a nut holder pivoted on said base and provided with a slot having a lateral entrance for admission of said shank to said slot, and a locking member pivoted to said base and having a cam for engagement with said shank to advance said slide into a locking position and also provided with a resilient locking element adapted to be sprung into engagement with said retaining shoulder, to lock the several parts, substantially as described.

3. In a nut lock, a base having a bore therein for projection therethrough of the threaded end of a bolt, a slide longitudinally movably mounted on said base and having a bolt thread engaging portion, said slide having a shank terminating in a retaining shoulder, a nut holder pivoted on said base and provided with a slot having a lateral entrance for admission of said shank to said slot, and a locking member pivoted to said base and having a cam for engagement with said shank to advance said slide into the locking position and also provided with a resilient locking element adapted to be sprung into engagement with said retaining shoulder, substantially as described.

4. In a nut lock, a base, a bolt engaging member slidable on said base, a nut holding member movable on said base and coacting with said slidable member to be held thereby in a nut holding position, and a locking member movable on said base for advancing said bolt engaging member into a locked position and coacting therewith to thereby hold itself and also said bolt engaging and nut engaging members in locked position, substantially as described.

5. In a nut lock, a base, a bolt engaging member slidable on said base, a nut holding member movable on said base and coacting with said slidable member to be held thereby in a nut holding position, and a locking member movable on said base for co-action with said bolt engaging member to thereby hold itself and also said bolt engaging and nut engaging members in locked positions, substantially as described.

6. In a nut lock, a base, a linearly slidable bolt engaging member mounted on said base, a nut holding member, a pivot mounted on said nut holding member on said base, a locking member eccentrically mounted on said pivot and having a cam for advancing said bolt engaging member into locked relation with said bolt and into locked relation with said nut holding member, said locking member co-acting with said bolt engaging member to hold the latter and said locking member in locked positions, substantially as described.

7. In a nut lock, a base, a linearly slidable bolt engaging member mounted on said base, a nut holding member pivoted on said base, and locking member pivoted on said base and co-acting with one of said first named members to lock the same and the remaining member in position, substantially as described.

In testimony whereof I affix my signature in presence of two witnesses.

BERNARD V. APFELD.

Witnesses:
J. J. LAVIN,
EDNA BROYLES.

Copies of this patent may be obtained for five cents each, by addressing the "Commissioner of Patents, Washington, D. C."